April 16, 1940.   A. J. SPITZ   2,197,532
BUMPER FOR VEHICLES
Filed Jan. 19, 1937   2 Sheets-Sheet 1
FIG. 1.
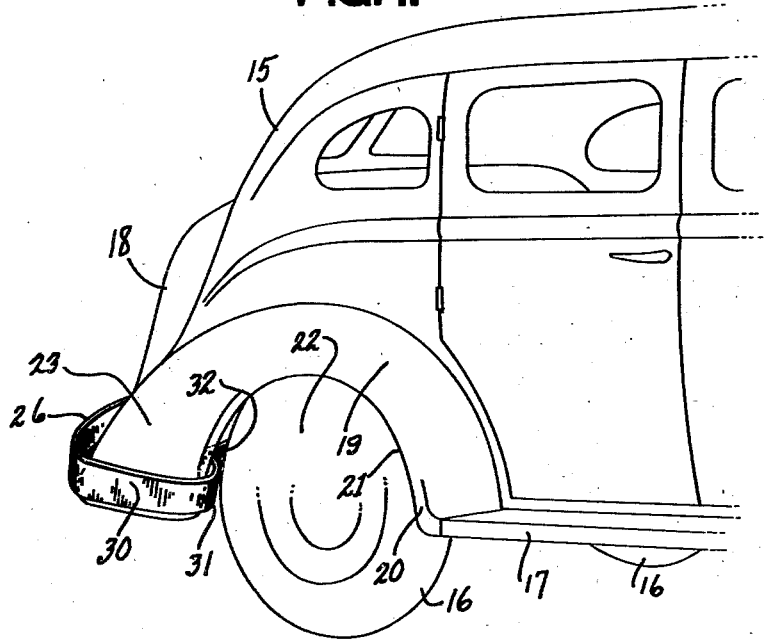
FIG. 2.   FIG. 3.
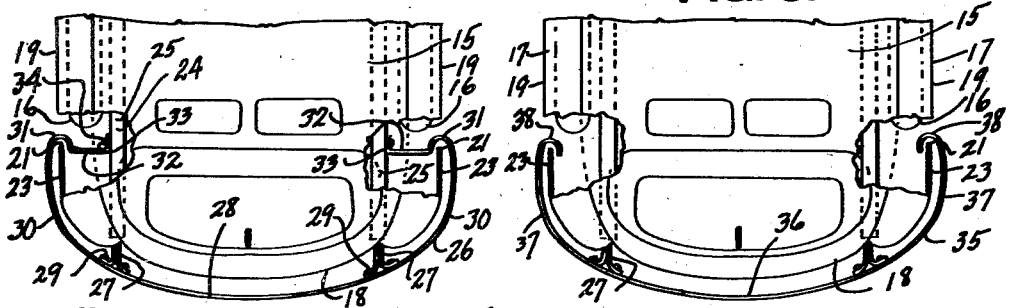
FIG. 4.   FIG. 5.
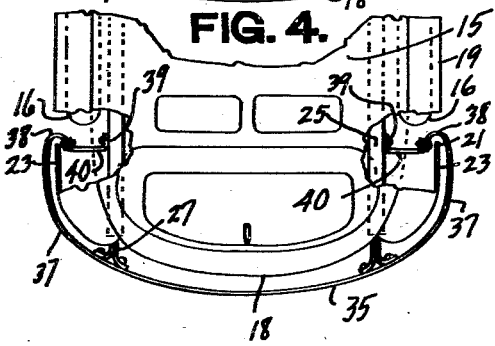
INVENTOR.
Alfred J. Spitz
ATTORNEYS.

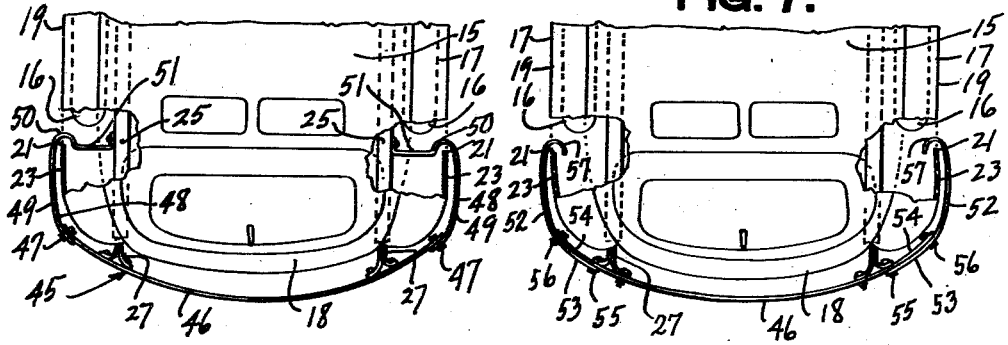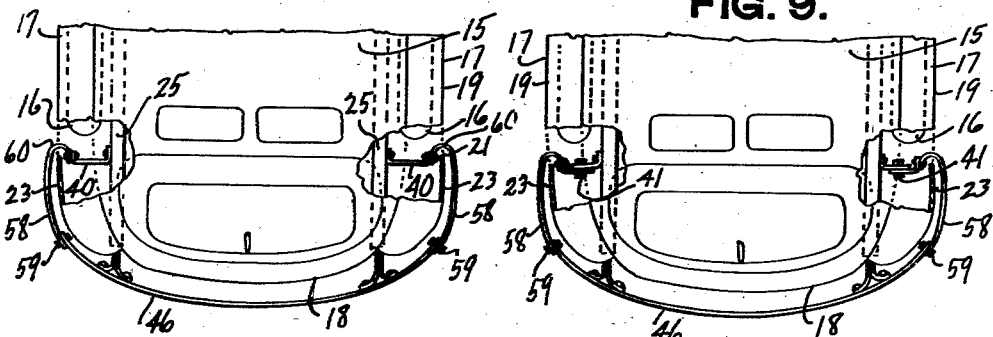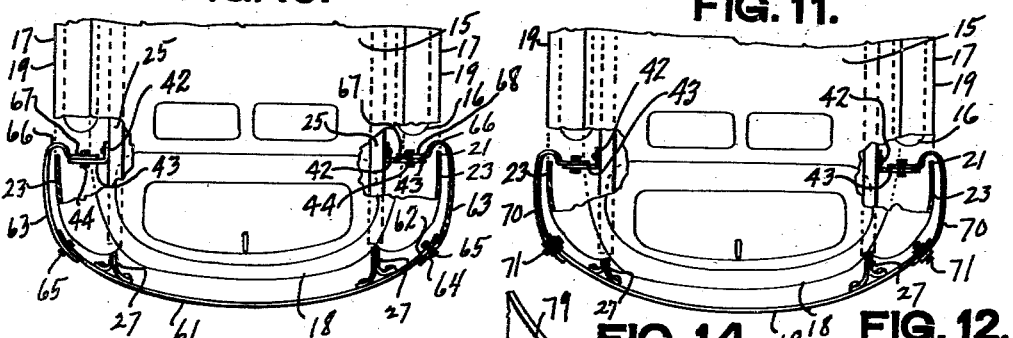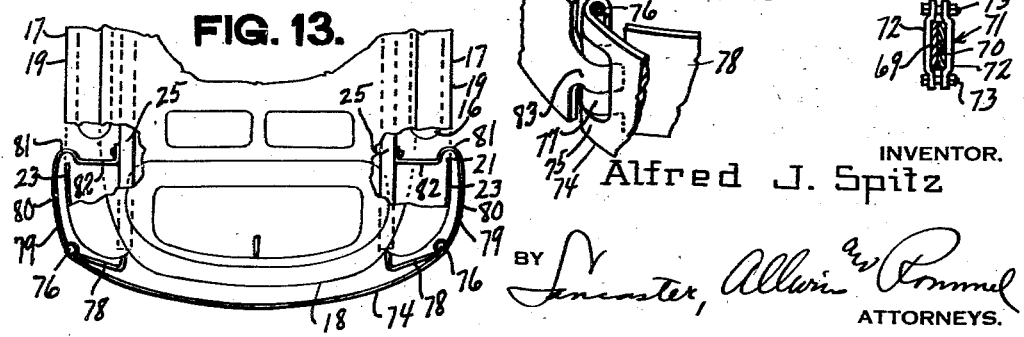

Patented Apr. 16, 1940

2,197,532

UNITED STATES PATENT OFFICE 2,197,532

BUMPER FOR VEHICLES

Alfred J. Spitz, Oklahoma City, Okla.

Application January 19, 1937, Serial No. 121,346

2 Claims. (Cl. 293—55)

The present invention relates to improvements in bumpers for vehicles and the primary object is to provide a bumper so constructed and so attached to a vehicle as to prevent hooking or interlocking engagement with the fenders or bumpers of other vehicles.

Another object of the invention is to provide protection for the corner portions of a vehicle and more particularly for those portions of fenders which are located in or adjacent the vehicle corners.

Another object of the invention is to provide a bumper construction tending to ward off or reduce the danger and damage to a vehicle and its occupants resulting from a glancing contact or blow against a side of the vehicle, and commonly known as side swiping.

A further object of the invention is to provide a bumper so constructed and mounted on a vehicle as to protect not only an end of the vehicle but also its sides, as when parking adjacent high curbings or walls, or in spaces between other vehicles.

A still further object is to provide a bumper construction as described which will not prevent access to or interfere with the removal of demountable rims or wheels.

Additional objects are to provide a vehicle side-protecting accessory which may be readily associated with the conventional end-protecting bumper of a vehicle; to provide a bumper which is readily adjustable; and to provide a bumper which may be attached to various makes and models of cars.

Other objects and advantages of the invention will be apparent from the following detailed description, taken in connection with the accompanying drawings forming a part of this specification and in which drawings—

Figures 1 and 2 are fragmentary perspective and top plan views respectively, and showing the preferred form of my improved bumper construction as it is applied to the rear end portion of a vehicle.

Figures 3–11 are fragmentary top plan views respectively showing modified forms of my improved bumper construction as it is applied to the rear end portion of a vehicle.

Figure 12 is a vertical sectional view showing a clamp utilized in the form of bumper construction illustrated in Figure 11.

Figure 13 is a fragmentary top plan view showing a further species of my invention as it is applied to the rear end portion of a vehicle.

Figure 14 is a fragmentary perspective view showing a hinged joint construction utilized in the species of my invention illustrated in Figure 13.

While my improved bumper construction is shown in the drawings in association with the rear end portion of a vehicle, it is to be distinctly understood that the invention is not restricted to such use as it may well be utilized at the front end portion of the vehicle.

In the drawings, which show preferred and modified forms of the invention, and wherein similar reference characters denote like parts throughout the various views, the numeral 15 designates a vehicle having a pair of wheels 16 on opposite sides 17 and inwardly adjacent the rear end 18 thereof. Each of the wheels 16 may be provided with an arcuate fender 19 including an outer flange 20 terminating in an edge 21 defining an opening 22 substantially concentric to the axis of the wheels. Preferably, each flange 20 may include a relatively wide, substantially triangular streamline skirt portion 23 positioned between a wheel 16 and the rear end 18 of the vehicle. Supported between the wheels 16 is a frame 24 including a pair of spaced apart side members 25 terminating at the rear end 18 of the vehicle.

Referring to the preferred form of invention shown in Figures 1 and 2, it will be seen that a continuous substantially U-shaped bumper bar 26 is provided. Projecting rearwardly from the end 18 of the vehicle is a pair of spaced apart bumper braces 27 to which the intermediate portion 28 of the bar 26 is secured as by bolts 29. Disposed at opposite sides of the vehicle and in spaced protective relation one to each of the skirt portions 23 is a pair of end portions 30 each provided with an inturned arcuate hook portion 31 integrally connecting with an inwardly-extending L-shaped bracket portion 32 secured at its inner leg 33 to a side member 25 as by a bolt 34. It will be noted that the bar 26 is continuous from one side member to the other and is supported in a very rigid manner by means of the braces 27 at the end of the vehicle and the bracket portions 32 which extend between the respective wheels and the skirt portion 23 in a manner permitting work to be done at the rear end portion of the vehicle, such as changing wheels or tires.

The form shown in Figure 3 includes a U-shaped bar 35 having an intermediate portion 36 secured to the end of the vehicle as by braces 27, and end portions 37 extending in spaced protective relation one along each of the skirt portions 23. These end portions 37 each terminate in inturned arcuate hook portions 38 disposed between the wheels 16 and the skirt portion 23.

The form shown in Figure 4 includes a bar 35 identical in construction and arrangement to the bar shown in Figure 3. Secured between each inturned arcuate hook portion 38 thereof and its adjacent side member 25 is a U-shaped bracket 39 having its intermediate portion 40 disposed away from the periphery of its adjacent wheel 16.

As for the form shown in Figure 5, it may also include a bar 35 similar to the bar shown in Figure 3. Secured between each inturned arcuate hook portion 38 thereof and its adjacent side member 25 is a longitudinally adjustable bracket 41, comprising a pair of L-shaped portions 42 each including adjacent longitudinally slotted legs 43 adjustably fixed in frictional contacting relation as by a suitable bolt 44.

In Figure 6, a bumper assembly 45 is provided including a separate end bar 46, preferably secured in outwardly spaced relation to the end of the vehicle as by braces 27. To each end of the bar 46 is secured as by a bolt 47, a continuous side bar and bracket member 48, including a side bar portion 49, an inturned arcuate portion 50 and a bracket portion 51 secured to its adjacent side member 25. It will be noted that where a vehicle is conventionally equipped with an end bumper such as the bar 46, only a slight amount of time will be required to attach the members 48.

In Figure 7 is shown a pair of hook-like members 52 each having an end portion 53 conforming in curvature to an end portion 54 of the bar 46. The end portion 53 preferably is secured in overlapping relation to the end portion 54 as by a pair of spaced apart bolts 55—56, the bolt 55 of which may also serve to secure the bar 46 to its supporting brace 27. The members 52 each extend across a skirt portion 23 and terminate in an inturned arcuate hook 57 positioned between a wheel 16 and the end of the vehicle and embracing the edge 21 of the skirt portion. The members 52 may readily be attached to vehicles already provided with an end bar 46. If desired, the bolts 55 alone may support the member 49, without the aid of the bolts 56, and especially where the members 46 and 52 are of conventional arcuate cross section.

The form shown in Figure 8 includes an end bar 46, a pair of hook-like members 58 similar to the members 52 (Figure 7) but secured to the end bar 46 by a single bolt 59. Securing each hook-like member 58 at its inturned arcuate forward end 60 to its adjacent side member 25 is a bracket 40 having the same function as the bracket 40 shown in Figure 4.

Figure 9 shows a form like that of Figure 8, except that the adjustable bracket 41 shown in Figure 5 is employed instead of the bracket 40.

Referring now to the form shown in Figure 10, the vehicle 15 is provided with a rear bumper bar 61 supported by a pair of brackets 27 and provided, at each end portion with a longitudinal slot 62. A pair of side bars 63 each provided with a slot 64 at one end portion are secured, as by bolts 65 extending through slots 62 and 64, to opposite ends of the bar 61. The side bars 63 may each extend across a skirt portion 23 and they are preferably each provided with an arcuate inturned portion 66 having an inward extension 67 provided with an elongate slot 68. The extension 67 may be secured to its adjacent side member 25 as by an L-shaped member 42 including a slotted leg 43 in conjunction with a bolt 44, in the same manner as disclosed in Figure 5. Longitudinal adjustment of the side bars 63 in order to compensate for variations in the skirt portions 23 may be accomplished at the slots 62 and 64, while lateral adjustment to compensate for variations in fender widths and frames is enabled at the bolt 44.

In Figure 11 is shown an end bar 69 and side bars 70 similar to the end bar 61 and side bars 63 respectively of Figure 10, except that the slots 62 and 64 and the bolts 65 shown in Figure 10 may be eliminated through the use of a pair of clamps 71 shown in detail in Figure 12. Each clamp may include a pair of jaws 72 embracing one end of the bar 69 and the rear end of one of the side bars 70, and which jaws may be releasably drawn together as by bolts 73.

As for the form illustrated in Figures 13 and 14, an end bar 74 is secured, at its bifurcated curled ends 75, as by pins 76, to the reduced bifurcated outer ends 77 respectively of a pair of resilient brackets 78 carried by the frame. A pair of continuous side bar and bracket members 79, each including a side bar portion 80, an inturned arcuate portion 81, and a bracket portion 82 is provided. These members 79 are each pivotally secured at their bracket end portions 82 to an adjacent side member 25, and at their opposite ends 83 are reduced and inwardly curled around the pins 76. It will thus be seen that a flexible, yieldable shock-absorbing assembly is provided which will permit relative pivotal movement at the pin 76, as upon contact of the bumper assembly with another bumper or object.

It will of course be understood that with some makes of vehicles, the frame members 25 may be positioned relatively higher or lower than the height of the side bumper bars, so that in those forms where the side bumper bars are secured to the side members 25, it may be found necessary to bend or curve the brackets upwardly or downwardly in order to meet the design of the vehicles.

Various changes may be made to the forms of invention herein shown and described, without departing from the spirit of the invention or the scope of the following claims.

I claim:

1. The combination with a vehicle having a wheel at one side and inwardly adjacent one end thereof, said wheel being provided with a fender including an outer flange terminating in an edge defining an opening substantially concentric to the wheel, said flange including a skirt portion between the wheel and the end of the vehicle, of a bumper having a main body portion secured to the end of the vehicle and having an end portion disposed adjacent the side of the vehicle and in protective relation to said skirt portion, said end portion including an inturned arcuate hook portion embracing the edge of the flange at the skirt portion thereof, and a longitudinally adjustable brace connecting the hook portion to a fixed side member of the vehicle.

2. The combination with a vehicle having a wheel at one side and inwardly spaced from one end thereof, said wheel being provided with a mud-guard including an outer flange terminating in an edge defining an opening substantially concentric to the wheel, said flange including a skirt portion between the wheel and the end of the vehicle, of a main bumper secured to the end of the vehicle and having an end adjacent said skirt portion, and an auxiliary bumper disposed adjacent the side of the vehicle and in protective relation to said skirt portion, said auxiliary bumper being adjustably clamped at one end to the end of the main bumper and at its opposite end including an inturned arcuate portion adjacent the edge of the flange at the skirt portion thereof, an L-shaped bracket having a first leg secured to a fixed side member of the vehicle and a second leg extending towards said inturned arcuate portion, and means adjustably connecting said second leg and said arcuate portion.

ALFRED J. SPITZ.